Patented May 3, 1938

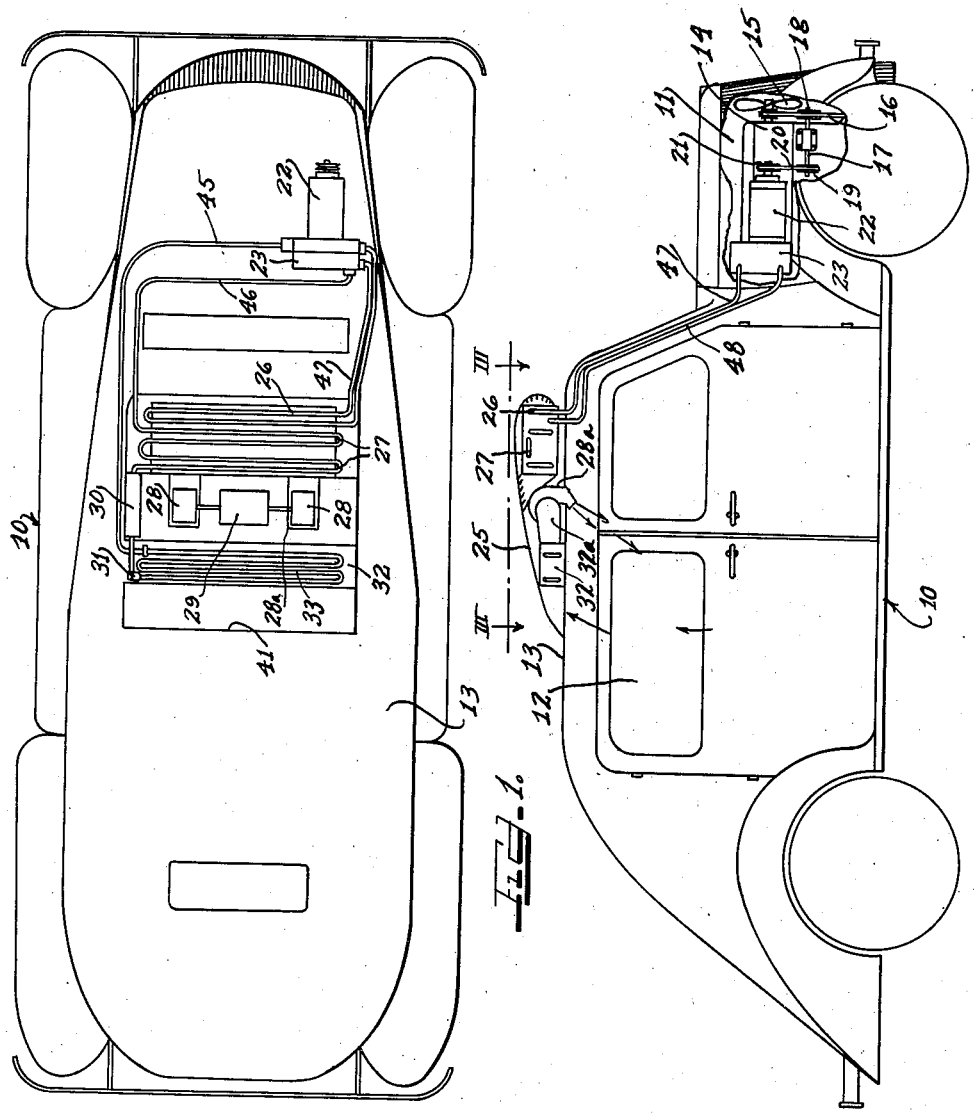

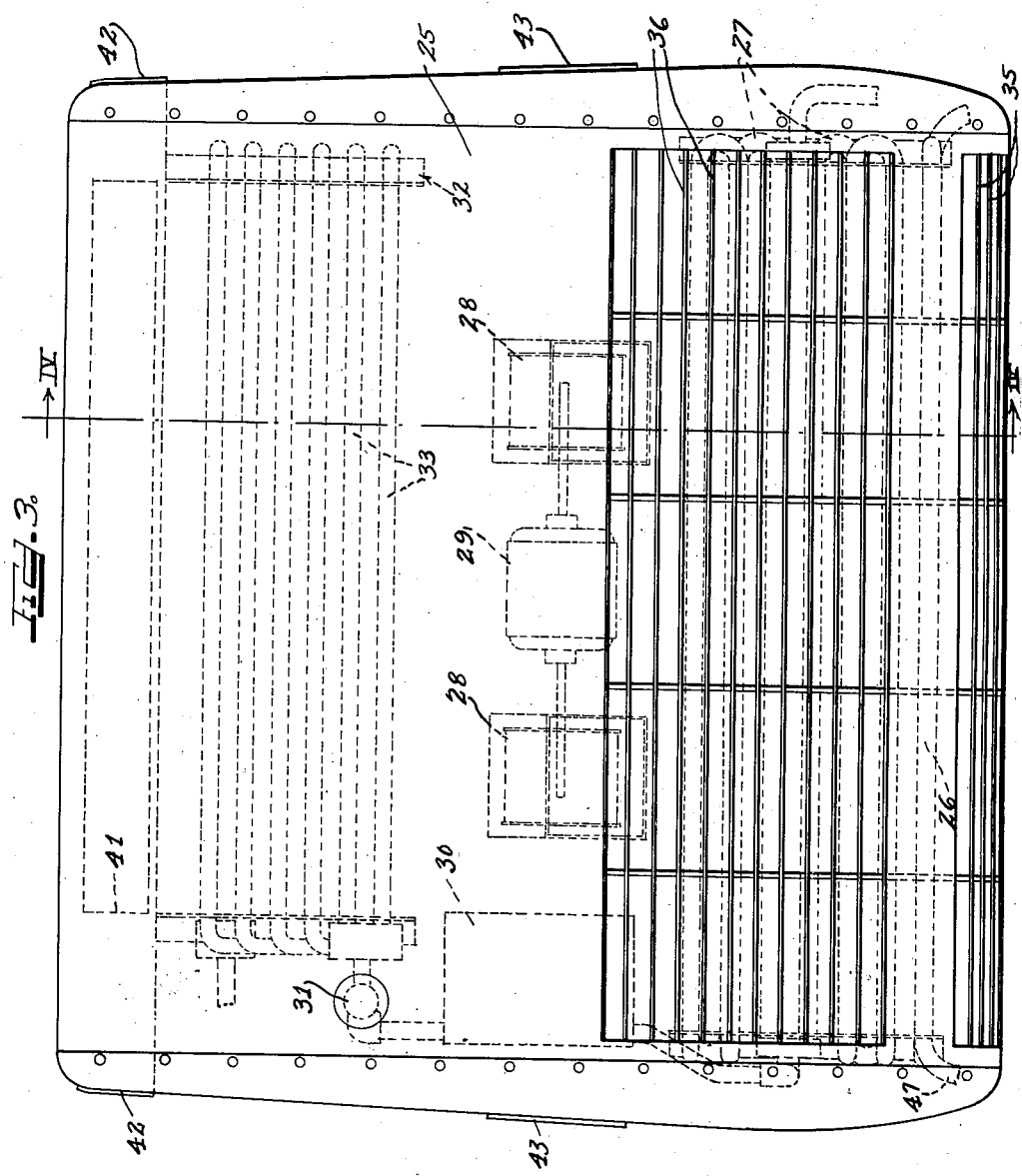

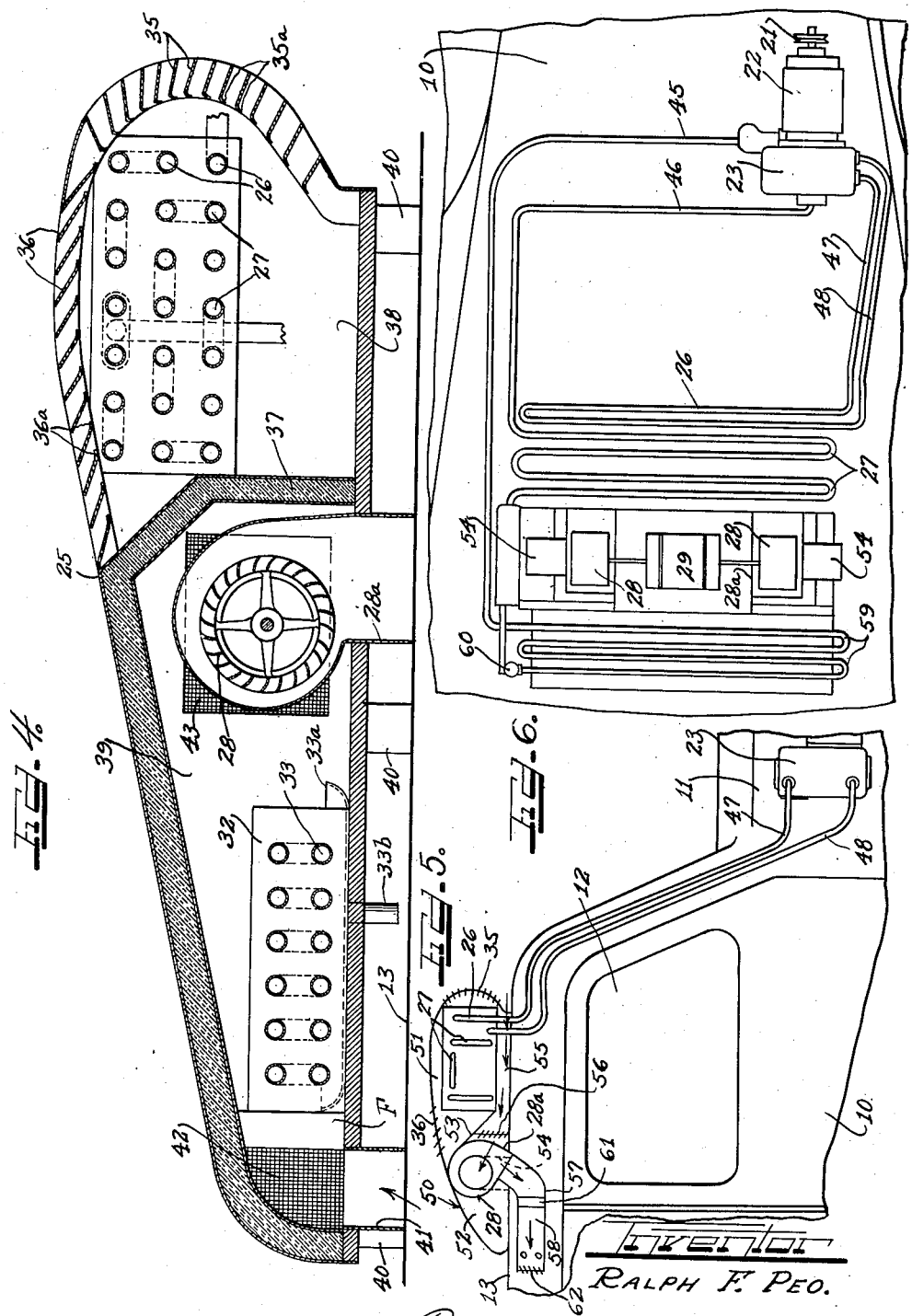

2,115,785

UNITED STATES PATENT OFFICE 2,115,785

AUTOMOBILE AIR CONDITIONING SYSTEM

Ralph F. Peo, Buffalo, N. Y., assignor to Houde Engineering Corporation, Buffalo, N. Y., a corporation of New York Application May 29, 1936, Serial No. 82,400

13 Claims. (Cl. 62—117)

This invention relates to air cooling apparatus for vehicles.

More particularly this invention relates to a compact air cooling mechanism adapted to be carried on the roof of a vehicle such as a closed type automobile, a taxicab or a truck and energized by power supplied from the engine of the vehicle.

The invention will be hereinafter described in combination with a sedan type automobile driven by an internal combustion engine but it should be understood that the invention is useful on all types of vehicles having a storage space or passenger compartment to be cooled.

According to this invention, a compact streamlined unit is mounted on the roof of a vehicle to be cooled and houses or carries the condenser, evaporator, expansion valve and one or more blowers of a refrigerating system of the compressor-condenser-evaporator type. The compressor of the system is preferably mounted in the motor compartment of the vehicle where it can be conveniently driven directly from the motor.

The compact stream-lined housing makes possible the mounting of the cooling apparatus in an out-of-the-way position and at the same time permits the free circulation of air around the condenser tubes to cool and condense the refrigerant therein.

One feature of the invention includes the cooling of the refrigerant compressor or pump by surrounding the same with a jacket and flowing a medium therethrough that will be vaporized by the heat of friction and gas compression in the pump. The vapors are led up to a separate condenser in the stream-lined housing on the roof of the vehicle, condensed and returned to the pump.

A suitable medium for cooling the pump can be different or the same refrigerant used in the air cooling apparatus. A refrigerant such as methylene chloride (CH$_2$Cl$_2$) is a satisfactory material for the refrigerant of the air cooling system and the cooling medium for the pump.

It is then an object of this invention to provide a compact air cooling apparatus for closed type vehicles adapted to be mounted on the roof of the vehicle.

Another object of this invention is to provide an air conditioning system for automotive vehicles including a compact stream-lined housing adapted to be mounted on the roof of the vehicle and house the condenser unit, the blower unit and, if desired, the evaporator unit of the system.

Another object of this invention is to provide an air cooling apparatus of the compressor-condenser-evaporator type for automotive vehicles in which the compressor is mounted in the motor compartment of the vehicle and the other elements of the apparatus are mounted on the roof of the vehicle.

A further object of this invention is to provide a cooling device for the compressor pump of an air conditioning system.

Another object is to provide a stream-lined unit in an automobile air conditioning apparatus adapted to be mounted on the roof of the automobile.

Other and further objects of this invention will become apparent from the following detailed description of the annexed sheets of drawings which disclose preferred embodiments of the invention.

On the drawings:

Figure 1 is a diagrammatic side elevational view of an automobile equipped with an air conditioning system of this invention with parts of the automobile body broken away to more clearly illustrate the air conditioning system.

Figure 2 is a top plan view of the automobile illustrated in Figure 1 and showing diagrammatically the arrangement of the elements of the air conditioning system.

Figure 3 is an enlarged top plan view of the stream-lined housing mounted on the automobile roof illustrated in Figure 1 taken along the line III—III of Figure 1 and showing the contents of the housing in dotted lines.

Figure 4 is a cross-sectional view taken substantially along the line IV—IV of Figure 3.

Figure 5 is fragmentary diagrammatic side elevational view of an automobile equipped with a modified form of air conditioning system according to this invention.

Figure 6 is a fragmentary top plan view of the automobile illustrated in Figure 5 and showing the arrangement of the elements of the air conditioning system.

As shown on the drawings:

In Figure 1, the reference numeral 10 indicates generally an automobile of the closed or sedan type having a motor compartment 11, a passenger compartment 12 and a roof 13.

The motor compartment 11 houses an internal combustion engine 14 which drives the vehicle 10. As is customary, a fan 15 is provided in front of the internal combustion engine 14 for drawing air through the radiator to cool the water therein. The fan 15 is driven from a crankshaft pulley (not shown) of the engine 14 through a belt 16.

According to this invention a jack shaft 17 is carried on the side of the engine 14 and has a pulley 18 at one end thereof engaging the fan belt 16 for rotating the shaft. The shaft 17 has another pulley 19 on the other end thereof which drives a belt 20 also trained around another pulley 21 of a governor clutch unit 22 for driving the governor clutch. The governor clutch unit 22 is a centrifugal throwout type of clutch which will automatically disengage by centrifugal force when the driven member thereof is rotated beyond a predetermined speed. A suitable type of governor clutch is disclosed and claimed in my co-pending application Serial No. 24,307 filed May 31, 1935 entitled: "Governor Clutch".

The governor clutch 22 drives a compressor pump 23 preferably of the rotary type.

A stream-lined housing 25 is mounted on the roof 13 of the vehicle 10 and houses two banks of condenser tubes 26 and 27, better shown in Figure 2, a pair of blowers 28, an electric motor 29, energized, for example, from the storage battery (not shown) of the vehicle, for driving the blowers 28, a receiver tank 30 for receiving condensed refrigerant from the condenser tubes 27, an expansion valve 31 and an evaporator unit 32 having coils 33 therein for receiving expanded refrigerant from the expansion valve 31.

As better shown in Figures 3 and 4, the stream-lined housing 25 has an open front portion equipped with a plurality of louvers or directing fins 35 extending laterally across the entire front of the unit. Likewise the top front portion of the housing 25 is open and has a plurality of louvers or air directing fins 36 extending in spaced relation across the top front portion of the housing. The louvers 36 also prevent the rays of the sun from entering the housing.

The rear portion of the housing tapers down from the open top portion and is thoroughly insulated from this portion by means of an insulated wall 37 (Figure 4). The insulated wall 37 extends to form the rear top portion of the housing 25.

As shown, therefore, the condenser tubes 26 and 27 are mounted in a separate compartment 38 in the front part of the housing 25 while the blowers 28 and the evaporator unit 32 are mounted in a compartment 39 of the housing in insulated relation to the compartment 38.

Air passes freely into the compartment 38 of the housing 25 through the open front of the housing and any forward movement of the vehicle will effect a rush of air between the louvers 35, over the condenser tubes 26 and 27 and out of the open top portion of the housing between the louvers 36.

The louvers 35 are preferably provided with turned down end portions 35a while the louvers 36 are preferably provided with horizontal portions or flanges 36a on their inner ends so that the rays of the sun cannot reach the condenser tubes.

As shown in Figure 4, the stream-lined housing 25 is mounted on the roof 13 of the vehicle 10 shown in Figures 1 and 2 by means of brackets 40.

The rear end of the housing 25 has an opening therein, in the bottom thereof, for receiving a duct 41 which communicates, through the roof 13 of the vehicle 10, with the passenger compartment 12 thereof. As best shown in Figures 2 and 3, this duct 41 extends for substantially the width of the housing 25.

In addition, as shown in Figures 3 and 4, the side walls of the housing 25 have grilled openings 42 at the rear end of the housing for receiving outside air to be admixed with the air from the interior of the vehicle. These openings 42 can be controlled by means of dampers (not shown) so as to admix any amount of outside air with the air from the vehicle passing through the duct 41.

The blowers 28 have housings 28a as best shown in Figure 4 communicating with the passenger compartment 12 of the vehicle 10 through the roof of said vehicle. Likewise both the sides of the housing 25 may have additional grilled openings 43 in the mid-portion of the housing opposite the blower intakes. The effective size or capacity of these openings 43 can be regulated by means of shutters or dampers (not shown).

Therefore, in the chamber 39 of the housing 25, the blowers 28 therein receive air through the sides thereof and propel this air through the housings 28a into the passenger compartment of the vehicle. Air within the vehicle is circulated through the inlet duct 41 at the rear of the compartment 39 and can be admixed with additional air through the rear openings 42 of the housing. The air thus admitted passes through a filter "F" over the cooling coils 33 of the evaporator unit 32, where it is cooled by contact therewith, and condensed moisture dripping from the cooling tubes 33 can be collected in a pan 33a (Fig. 4) mounted under the evaporator unit and drained through a drain pipe 33b extending through the housing 25. The cooled air is then drawn into the blower housing 28a through the sides thereof together with outside air provided that the openings 42 are not closed. The blowers 28 will admix the two streams of air and blow the same into the interior of the housing. Thus the openings 42 provide for an admixing of outside air with the recirculated air from the interior of the vehicle while the openings 43 provide for a tempering of cooled air with outside air so that the air introduced into the vehicle will not cause discomfort.

If desired the rear compartment or chamber 39 of the housing 25 can have a duct therein receiving air from the duct 41 and openings 42. The filter and evaporator unit can be mounted in the duct. The duct can have branch ducts such as 32a (Fig. 1) for directly conveying the cooled air to a side opening in each of the blower housings 28a.

As shown in Figures 1 and 2 the compressor pump 23 receives spent refrigerant from the cooling coils 33 through a return line 45. The spent refrigerant is then compressed in the compressor 23 and the compressed refrigerant flowed through the tube 46 into the condenser tubes 27 where it is condensed and collected for storage in the receiver tank 30. The condensed refrigerant is expanded through the expansion valve 31 into the evaporator unit 32.

One of the features of this invention provides for a cooling of the compressor pump 23 so that the refrigerant compressed therein will be more efficiently condensed in the condenser tubes 27.

According to this invention the compressor pump 23 is provided with a jacket so as to form a chamber substantially surrounding the entire pump. This chamber is filled with a volatile liquid such as the same refrigerant that is used in the cooling system. The heat developed in the pump causes the liquid in the chamber therearound to boil. The vapors of this boiling liquid are led through a tube 47 into the condenser 26 mounted in front of the housing 25. The liquid is then condensed in the condenser tubes and flows back by gravity through the tube 48 into the chamber surrounding the pump 23. This circulation of a volatile liquid effects a dissipation of heat from the pump 23 so as to maintain the same in a cool running condition.

From the above description of Figures 1 to 4 it should be understood that one modification of this invention provides for the driving of a compressor pump in a cooling apparatus of the compressor-condenser-evaporator type directly from the engine of a self-propelled vehicle. A streamlined housing is mounted on the roof of the vehicle and contains the condenser, the evaporator and blowers of the cooling apparatus. This housing is divided in two compartments. The front compartment is adapted to freely receive air therethrough and the condenser tubes are mounted in this compartment for cooling refrigerant circulated therethrough. The rear compartment is fully insulated and houses the blower, the refrigerant receiver tank, the expansion valve and the evaporator unit. The housing 25 is in communication with the passenger compartment 12 of the vehicle through the roof 13 of the vehicle and receives air from the passenger compartment at the rear end of the housing. This air can then be admixed with outside air if desired by opening the ports 42 in the rear side walls of the housing. The air from the interior of the vehicle or the air from the interior of the vehicle in admixture with outside air entering through the ports 42 is directed over the cooling tubes 33 of the evaporator unit 32 and blown by the blowers 28 back into the passenger compartment 12. The blower housing directly communicates with the passenger compartment 12 through the roof thereof. If desired additional side ports in the housing such as the ports 43 can be opened to admit outside air for tempering the cooled air entering the blowers after passage over the cooling tubes 33.

In this manner an air conditioning system for an automobile can be fully mounted in out-of-the-way position and not interfere with any of the storage or passenger space of the vehicle.

Another modification of this invention is shown in Figures 5 and 6 wherein the evaporator unit of the cooling apparatus together with the expansion valve is mounted in the passenger compartment of the vehicle.

As shown in Figures 5 and 6 parts identical with the parts described in Figures 1 to 4 have been marked with the same reference numerals.

The stream-lined housing 50 mounted on the roof of the vehicle 10 in Figure 5 has a front and rear compartment 51 and 52 separated by an insulating wall indicated at 53. The front compartment 51 contains the condenser tubes 26 and 27 in the same manner as the compartment 38 of the housing 25. The rear compartment 52, however, only contains the blowers 28 and the motor 29 for driving these blowers. Ducts 54 extend from the inlets of the blower housings 28a and communicate with the passenger compartment 12 through the roof 13 of the vehicle and with the rotor of the fan. The other inlet sides of the blowers 28 communicate with duct 55 formed under the housing 50. In this manner air from the front of the vehicle can be directed under the housing 50 through the duct 55 and admixed in the blowers 28 with recirculated air from the interior 12 of the vehicle. The amount of outside air passing through the duct 55 into the blowers 28 can be carefully regulated by means of dampers 56 which may be opened or closed to any desired degree.

The blower housings 28a communicate through ducts 57 with a housing 58 in the interior 12 of the vehicle 10. This housing 58 contains the cooling coils 59 and the expansion valve 60 (Figure 6) of the cooling apparatus. The housing also contains a filter 61 (Figure 5) for filtering the air from the ducts 57. The recirculated air from the interior of the vehicle 12 passing through the ducts 54 and the outside air passing through the ducts 55 is thus admixed in the blowers and discharged through the ducts 57 over the cooling tubes 59 in the housing 58. The outlet of the housing 58 can be regulated to any desired capacity by means of dampers 62.

In the construction shown in Figures 5 and 6, therefore, the evaporator unit is mounted in the interior of the vehicle and all of the air directed into the vehicle must pass over the evaporator unit.

It should be understood that many modifications other than those disclosed in the drawings can be utilized without departing from the scope of this invention. The invention broadly comprises provision of a compact unit for mounting on the roof of a vehicle to be air conditioned to house many of the elements of the air cooling system.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An air conditioning system for roofed vehicles comprising a refrigerant compressor, means for driving said compressor, a housing outside of the vehicle body on the roof of the vehicle having front and rear compartments, said front compartment of the housing adapted to receive air freely therethrough, a refrigerant condenser in said front compartment, an air blower in said rear compartment, said rear compartment having inlet and outlet connections communicating with the interior of the vehicle whereby air is circulated by the blower from the vehicle interior thru the rear compartment of the housing and back to the interior of the vehicle and an evaporator unit in the path of said air adapted to receive refrigerant from the condenser for expansion therein to cool the air flowing therearound.

2. An air conditioning system for roofed vehicles comprising a refrigerant compressor, means for driving said compressor, a housing outside of the vehicle body on the roof of the vehicle having front and rear compartments, said front compartment of the housing adapted to receive air freely therethrough, a refrigerant condenser in said front compartment, an air blower in said rear compartment, said rear compartment having inlet and outlet connections communicating with the interior of the vehicle whereby air is circulated by the blower from the vehicle interior thru the rear compartment of the housing, said rear compartment also having additional openings communicating with the outside of the housing for passing outside air therethrough to be admixed with the recirculated air therein, and an evaporator unit in the path of said air adapted to receive refrigerant from the condenser for expansion therein to cool the air flowing therearound.

3. An air conditioning system for closed type automobiles comprising a compressor pump mounted on the automobile, means for driving the pump from the automobile motor, a stream-lined housing on the outside roof of the automobile having open front and top portions and a closed rear compartment, a condenser in the housing adapted to be cooled by air circulating through the open front and top portions of the housing, a blower in the rear compartment of the housing for circulating air from the passenger space of the automobile thru the compartment and back to the passenger space and an evaporator unit in the path of said air.

4. An air conditioning system for closed type self-propelled vehicles having a motor compartment with a motor therein and a space separated from the motor compartment, a compressor pump in the motor compartment, means for driving the pump directly from the motor in said compartment, a stream-lined housing on top of the roof of said vehicle having front and rear chambers therein, said front chamber having open front and top portions permitting free circulation of outside air therethrough, a condenser in said front compartment for receiving compressed refrigerant from the pump, a blower in said rear compartment, means for driving said blower in said rear compartment, an expansion coil and an evaporator unit in said rear compartment behind said blower, inlet and outlet ducts communicating through the roof of said vehicle with the rear compartment, means communicatively joining the condenser in the front compartment with the expansion valve in the rear compartment, means joining the expansion valve with the evaporator unit to expand refrigerant therein for cooling the evaporator unit whereby air is circulated from the space to be cooled over said evaporator unit and back into the space by said blower.

5. An air conditioning unit for closed type automobiles comprising a compressor pump driven by the motor of said vehicle, a stream-lined housing mounted on top of the roof of the vehicle having front and rear compartments, spaced louvers in the front and top portions of said front compartment of the housing for directing air through the compartment, a condenser in said front compartment adapted to be cooled by air circulating therethrough, a tube connecting the high side of the pump with the condenser whereby the compressed refrigerant is condensed as it flows through the condenser, blowers, an expansion valve and an evaporator unit in said rear compartment of the housing, means for supplying condensed refrigerant to the expansion valve for expansion into the evaporator unit and ducts communicating through the roof of the vehicle for joining the space to be cooled therein with the rear compartment whereby air is circulated by said blowers from said space to be cooled over the evaporator unit and back into the space.

6. A cooling unit for self-propelled vehicles comprising a stream-lined housing adapted to be mounted on top of the roof of the vehicle, said housing having front and rear compartments therein in insulated relation, a condenser in said front compartment, a blower and an evaporator unit in said rear compartment, said front compartment having open front and top portions permitting the free passage of air therethrough around the condenser therein and said rear compartment having inlet and outlet ducts adapted to communicate with the space of the vehicle to be cooled.

7. In an air conditioning system for closed type automobiles, a stream-lined housing adapted to be mounted on top of the roof of said automobile, said housing having front and rear compartments in insulated relation, and said front compartment having open front and top portions permitting the free circulation of air therethrough.

8. In an air conditioning system for closed type automobiles, a stream-lined housing adapted to be mounted on top of the roof of such automobiles, said housing having front and rear compartments in insulated relation, said front compartment having open front and top portions, spaced louvers extending across said open portions of the front compartment to prevent rays of sun from entering the compartment and to direct a flow of air therethrough and inlet and outlet ducts in said rear compartment adapted to communicate through the roof of the vehicle with the space therein to be cooled.

9. An automobile air conditioning system comprising, in combination with a closed type automobile having a motor compartment containing a motor for driving the vehicle and a space to be cooled separated from said compartment, a compressor pump in the motor compartment, means for driving the compressor pump directly from the motor therein, a stream-lined housing mounted on top of the roof of the vehicle having front and rear chambers therein in insulated relation, said front compartment having openings therein permitting free passage of air therethrough, a condenser in said front chamber, a tube joining the high side of the compressor with the condenser whereby compressed refrigerant is flowed through the condenser and cooled by circulation of air therearound, a pair of blowers in said rear compartment having outlet housings in communication with the interior of the automobile to be cooled, an electric motor for driving said blowers, a receiver tank in said rear compartment for receiving condensed refrigerant from the condenser, an expansion valve and an evaporator unit in said rear compartment for receiving the refrigerant from the receiver, an inlet duct extending through the roof of the vehicle for defining a passageway for air from the vehicle into the rear compartment whereby said blowers effect the circulation of air from the automobile interior over the evaporator unit and back to the interior.

10. An automobile air conditioning system for cooling a passenger space of a closed type automobile comprising a compressor pump mounted on said automobile, means for driving the pump directly from the automobile motor, a housing surrounding the compressor pump to define a closed chamber around the pump, a stream-lined housing mounted on top of the roof of the vehicle, said housing having front and rear compartments in insulated relation, said front compartment adapted to receive air freely therethrough, a refrigerant condenser mounted in said front compartment for receiving compressed refrigerant from the pump, a second condenser mounted in said front compartment for receiving vapors of a liquid in the chamber around the pump to condense the same, means for flowing the condensed liquid back to the pump chamber, a receiver tank in the rear compartment of the housing for receiving condensed refrigerant from the refrigerant condenser, an expansion coil and an evaporator unit in said rear compartment for receiving refrigerant from the receiver and inlet and outlet ducts joining the passenger space to be cooled with the rear compartment of the housing and blowers for circulating air from passenger space through the rear compartment of the housing around the evaporator unit and back to the passenger space.

11. An air conditioning unit for cooling the air in the passenger space of closed type automobiles comprising a stream-lined housing adapted to be mounted on top of the roof of such an automobile having front and rear compartments in insulated relation, said front compartment having louvered openings in the front and top portions thereof permitting the free circulation of air therethrough, said rear compartment having ducts communicating through the roof of the vehicle for receiving air from the passenger space and for directing cooled air back to said space, openings in the sides of said rear compartment for admixing outside air with the air therein from the passenger space and an evaporator unit in the path of said air for cooling the air before it is circulated back to the passenger space.

12. In an air conditioning system for closed type automobile having a space therein to be cooled, a stream-lined housing mounted on top of the roof of said vehicle having front and rear compartments in insulated relation, said front compartment adapted to receive air freely therethrough, a condenser mounted in said front compartment in free contact with the air passing therethrough, a blower mounted in said rear compartment having a housing with an outlet duct extending through the roof of the vehicle into the space therein to be cooled, an evaporator unit in said outlet duct, said blower housing also having an inlet duct communicating with the space to be cooled for receiving air therefrom and means for introducing outside air into the blower for admixture with the air therein.

13. The process of cooling passenger spaces of closed type automobiles which comprises circulating air from the passenger space through the roof of the vehicle into an insulated compartment on the roof of the vehicle, cooling the air in said compartment, admixing outside air with said cooled air and recirculating the air through the roof of the vehicle back to the passenger space.

RALPH F. PEO.